July 31, 1923.
J. W. LAYNE
SCRAPER
Filed June 17, 1921
1,463,745
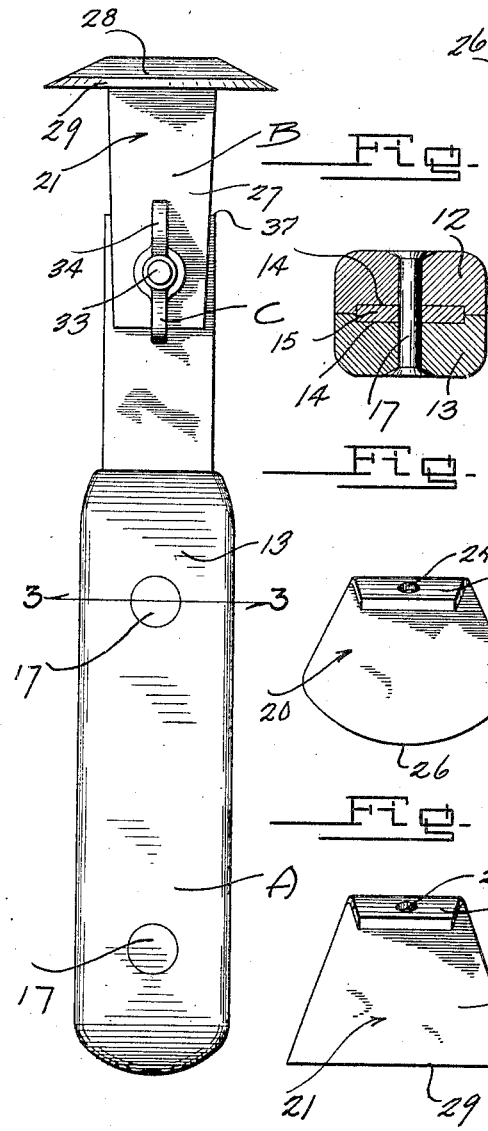
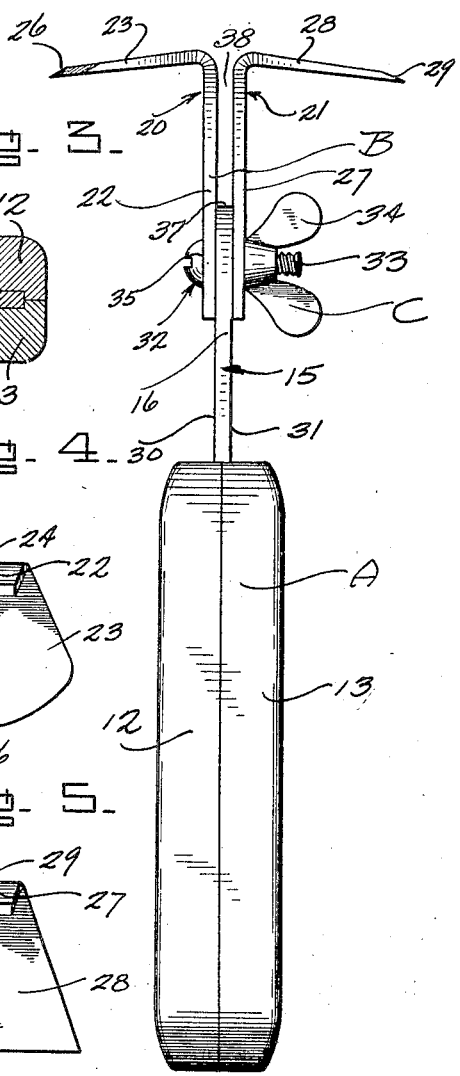
Inventor
James W. Layne Patented July 31, 1923.

1,463,745

UNITED STATES PATENT OFFICE.

JAMES W. LAYNE, OF DANVILLE, VIRGINIA.

SCRAPER.

Application filed June 17, 1921. Serial No. 478,384.

*To all whom it may concern:*

Be it known that I, JAMES W. LAYNE, a citizen of the United States, residing at Danville, in the county of Pittsylvania and State of Virginia, have invented certain new and useful Improvements in Scrapers, of which the following is a specification.

This invention relates to improvements in surface scrapers.

The primary object of the invention, is the provision of a scraping device as used by painters and the like, for the purpose of removing paint, varnish, or other matter from regular or irregular surfaces.

Specifically, the invention includes a handle portion, having a plurality of various shaped scraping blades detachably mounted thereon in novel formation, to effect a simple, compact, and economic arrangement.

Other objects and advantages will be apparent during the course of the following detailed description.

In the accompanying drawing forming a part of this specification, and in which similar reference characters designate corresponding parts throughout the several views:

Figure 1 is a side elevation of the improved scraper, showing details thereof.

Fig. 2 is a front elevation, at right angles to that shown in Figure 1, and showing details of the improved scraper.

Fig. 3 is a cross sectional view taken on the line 3—3 of Figure 1.

Fig. 4 is a view of a special scraping blade, used for removing matter from arcuate or irregular surfaces.

Fig. 5 is a view showing a blade designed for removing paint or the like from flat surfaces.

In the drawing, wherein for the purpose of illustration is shown the preferred embodiment of my invention, the letter A designates a handle structure, including a plurality of scraping blades B, detachably mounted to the handle A by a single clamping means C.

The handle A, is of compact and durable formation, including a pair of hand engaging sections 12 and 13, each of said sections 12 and 13 being longitudinally grooved as at 14, to provide recesses in their abutting faces. The grooves 14 are of the same depth in each of the sections 12 and 13, and are provided for receiving a central metal bar 15. The bar 15, is adapted to fit practically the entire length within the sections 12 and 13, longitudinally thereof, and adapted to project in a portion 16, upwardly from said sections 12 and 13. The bar portion 15, is less in width than the width of either the section 12 and 13, so that the same snugly fits within a pocket provided by the grooved recesses 14. Countersunk rivets 17 are provided at spaced intervals through suitable apertures in the sections 12 and 13, and through the bar 15, to rigidly affix the bar 15 in position to form the handle A. A suitable aperture is provided in the upper portion of the projecting part 16 of the bar 15, for receiving certain details of the adjusting means C.

The scraping blades B, preferably include a blade 20, for scraping arcuate or irregular surfaces, and a blade 21 for scraping flat or even surfaces. The arcuate blade 20, preferably includes an attaching portion 22, and a blade portion 23. The portions 22 and 23, extend substantially at right angles to each other. The attaching portion 22, is relatively longer than the blade portion 23, and is provided with an aperture 24 adjacent its end opposite to the blade portion 23. The blade portion 23, is provided upon its outer end with the bevelled knife edge 26, arcuating in convex manner for accommodation of irregular surfaces. The blade portion 23 of the scraper blade 20, can of course be of any special formation, to accommodate irregular surfaces.

The blade 21, likewise, preferably includes an attaching portion 27, and a blade portion 28. It is preferred that the portions 27 and 28 be bent or formed substantially at right angles to each other. The attaching portion 27, is relatively longer than the blade portion 28, and provided within its end opposite the blade portion 28, with an aperture 29, for reception of a portion of the clamping means C, to be subsequently described. The blade portion 28 of the scraper 21, is provided upon its extreme outer end with a straight knife edge 29, adapted for scraping flat surfaces. The blade 21, will of course be a necessary part on every one of the improved scrapers, since flat surfaces are of course in the great majority. The blades 20 and 21 are similar, in that their attaching portions 22 and 27, converge at a very slight taper from their connection with their respective blade portions. Likewise, the blade portions 23 and 28, of the scraping blades 20 and 21, flare outwardly rather sharply from their connection with the attaching portions 22 and 27. This arrangement, has been designed to provide the greatest possible efficiency in such an instrument.

In assembling the improved scraper, the blades 20 and 21, are positioned upon the opposite sides 30 and 31 of the projecting portion 16 of the metal bar 15. The blade portions 23 and 28, are disposed to project in opposite directions to each other, and in such manner that the attaching portions 22 and 27 have their respective apertures 24 and 29, aligning with the aperture in the upper end of the portion 16. When in this position, they will be as illustrated in Figure 2 of the drawing with the major length of each attaching portion extending upwardly from the top marginal edge 37 of the supporting bar 15, providing a space 38 therebetween. By this arrangement, the attaching portions of the scraper blades 20 and 21 may flex somewhat in order to facilitate a scraping operation. A retaining screw 32, is adapted for free insertion through the apertures of the scraping blades and the handle A, and includes a screw threaded stem 33, adapted to project for receiving a wing nut 34, for clamping purposes. Upon tight clamping of the nut 34 upon the screw stem 33, the head 35 of the screw 32, will lie in contact with one of the scraping blades, said nut contacting the other. In this manner, the blades 20 and 21 are adjustably and detachably mounted in secure position upon the scraping handle A.

Due to the proximity of the scraping blades 20 and 21, a surface being worked upon, can be quickly finished, in a minimum of time, due to the combined uses of a single scraping tool embodying arcuate and straight surface blades. Should either of the blades 20 or 21, become damaged to an extent as to necessitate a new one, said damaged blade can be quickly removed by means of the detachable clamp structure C.

Various changes in the shape, size, and arrangement of parts may be made to the form of the invention herein shown and described, without departing from the spirit of the invention or the scope of the claim.

I claim:

A scraping tool comprising a supporting bar and handle structure having an opening adjacent the upper end thereof, scraping blades having different scraping edges outwardly thereon each including a blade portion and a relatively longer attaching portion extending at a substantial angle to the blade, the attaching portions of said blades having apertures thereon immediately adjacent their free end edges adapted for alignment with the aperture of said supporting bar upon the opposite sides of the latter, and detachable clamping means inserted through the aligning apertures of the scraping blades and bar whereby said attaching portions of said scraping blades extend upwardly from the top marginal edge of the supporting bar for their major lengths providing a space therebetween.

JAMES W. LAYNE.